United States Patent [19]
Tyner

[11] 3,948,332
[45] Apr. 6, 1976

[54] ELECTRIC CADDY CART

[76] Inventor: Richard A. Tyner, 1619 N. Clybourn Ave., Chicago, Ill. 60614

[22] Filed: Jan. 22, 1975

[21] Appl. No.: 543,115

[52] U.S. Cl............. 180/19 R; 180/65 F; 180/68.5
[51] Int. Cl.².......................................... B62D 51/04
[58] Field of Search............ 180/19 R, 19 H, 11, 13, 180/65 R, 65 F, 68.5, 26 R

[56] References Cited
UNITED STATES PATENTS

| | | | |
|---|---|---|---|
| 3,094,185 | 6/1963 | Racoosin | 280/DIG. 5 |
| 3,265,147 | 8/1966 | Coordes | 180/65 F X |
| 3,561,555 | 2/1971 | Carmichael | 180/19 R X |
| 3,820,617 | 6/1974 | Groff | 280/DIG. 5 |

Primary Examiner—M. H. Wood, Jr.
Assistant Examiner—John A. Pekar
Attorney, Agent, or Firm—Hill, Gross, Simpson, Van Santen, Steadman, Chiara & Simpson

[57] ABSTRACT

An electric caddy golf cart including a motor driven drive wheel, a mounting bracket member supported at the lower end of the golf cart frame, a drive wheel rotatably supported on the bracket member, a drive motor connected to said bracket member and interconnected by gearing to the drive wheel to drive the latter and a battery supporting means adapted to carry a battery for powering said motor and switch and rheostat means mounted on the golf cart handle for starting and stopping the motor and controlling the speed of the motor and the golf cart.

7 Claims, 6 Drawing Figures

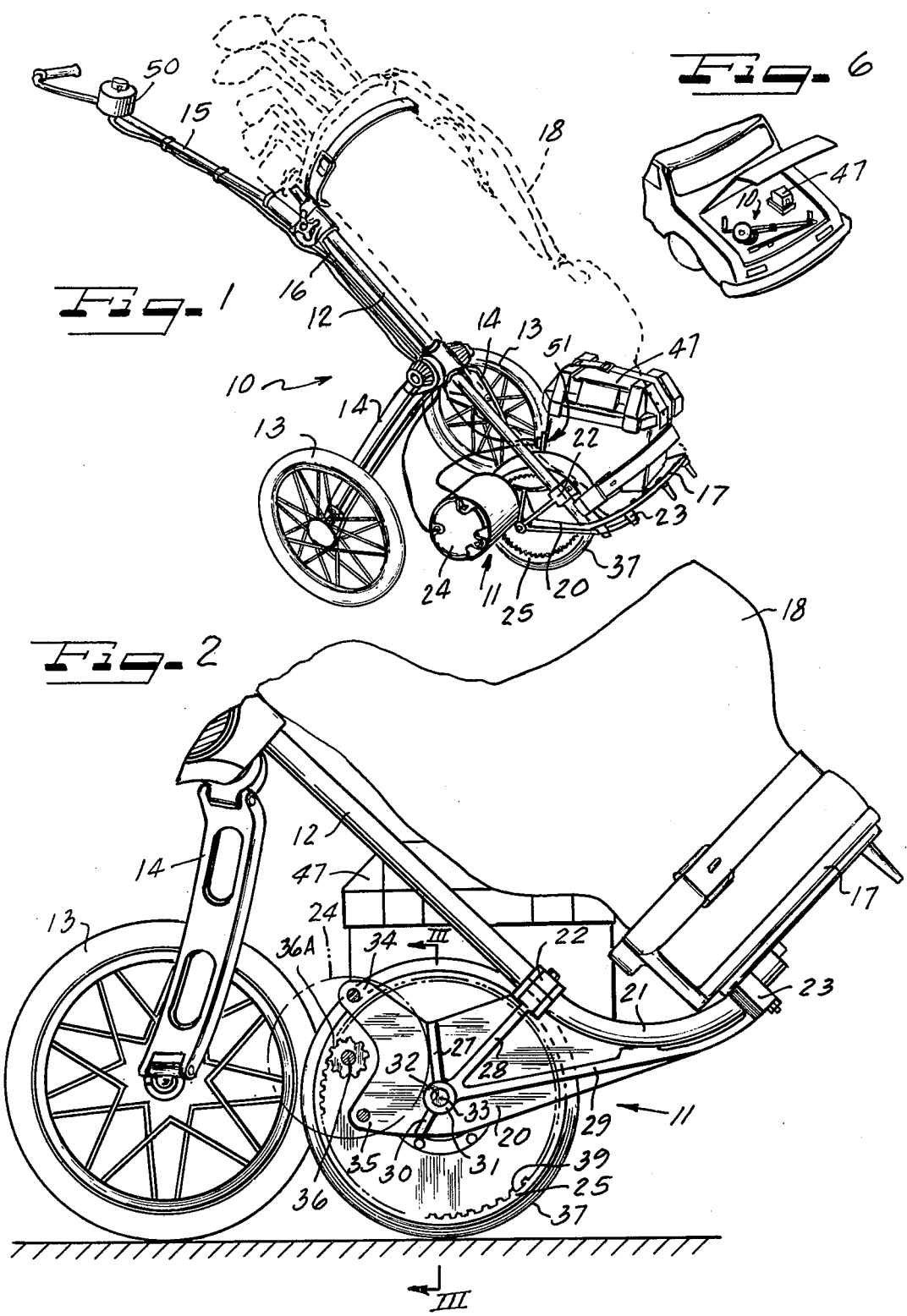

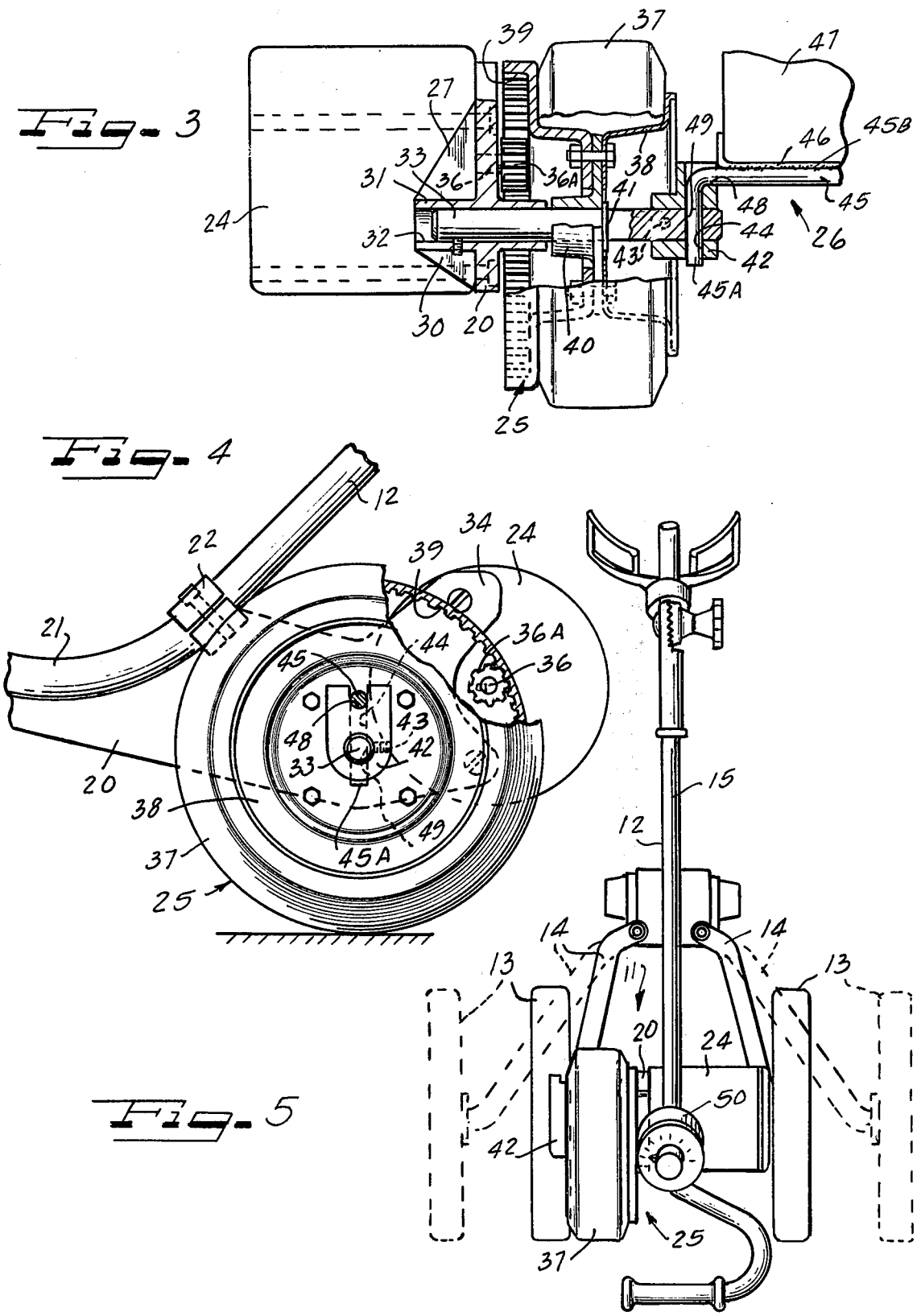

ELECTRIC CADDY CART

This invention relates to a hand movable motorized golf cart.

The use of hand drawn or hand movable golf carts is well known. These hand movable golf carts do have the disadvantage under certain conditions that they require a certain expenditure of energy on the part of the person using them on the golf course. This becomes somewhat of a problem with people who have a physical ailment such as a heart condition, for example, yet oftentimes these people are not inclined to use an electric golf cart of the sit-down variety. The latter may be objected to on the basis that they are too expensive to rent or buy. As a compromise situation, it would be desirable to motorize a normally hand drawn golf cart. This obviously would be an advantage from the standpoint of portability as well as expense in comparison to one of the motor driven sit-down types.

SUMMARY OF THE INVENTION

It is an object of the present invention to provide a hand drawn golf cart with a motorized drive wheel unit so that energy expended in moving the golf cart is kept to a minimum.

Another object of the invention is to provide a motorized hand drawn golf cart which is compact, is easily portable and can be conveniently transported in a car trunk.

Another object of this invention is to provide a motor driven drive wheel attachment which may be easily secured to a frame member of a hand drawn golf cart.

Another object of this invention is to provide a motorized drive attachment for attaching to a hand drawn golf cart which includes a bracket member on which a drive wheel is mounted and on which a drive motor for the drive wheel also is mounted. In addition, means are provided to support a battery thereon.

Other objects and advantages of the invention will become more apparent when considering the following description in conjunction with the accompanying drawings.

DESCRIPTION OF THE DRAWINGS

FIG. 1 is a perspective view of a golf cart embodying the invention herein;

FIG. 2 is a side view of a portion of the golf cart showing a bracket member for supporting the drive wheel;

FIG. 3 is a front elevation view taken along line III—III of FIG. 2 and partially in section of the drive wheel mounted on the bracket member and showing the drive motor and battery support means mounted on each side of the drive wheel;

FIG. 4 is an end view showing the battery support means mounting lug on the drive axle;

FIG. 5 is a front view of the golf cart in a folded condition;

FIG. 6 is a perspective view of the trunk space of an automobile showing the storage of the golf cart with the battery detached therefrom.

DESCRIPTION OF PREFERRED EMBODIMENT

Referring now to the drawings wherein like reference numerals indicate similar parts, FIG. 1 shows a golf cart generally designated 10 with a motor drive attachment 11 disposed at the lower end thereof. The golf cart illustrated herein is a conventional golf cart comprising an elongated frame member 12, usually tubular, on which are mounted a pair of wheels 13 attached to wheel supporting arms 14. A conventional foldable handle 15 is hingedly attached to the upper end of the elongated frame member 12. A link arm 16 interconnects the handle 15 with the wheel supporting arms 14 whereby pivotal movement of the handle 15 is effective to fold the wheels 13 and their supporting arms 14 in and out, that is to a non-use or use position as is well known. A golf bag support plate 17 is attached at the lower end of the tubular frame member 12 for supporting a golf bag 18 thereon, the latter being shown in phantom in FIG. 1.

The motor drive attachment 11 comprises a bracket member 20, a drive motor 24, a drive wheel 25 and a battery support means 26. The bracket member 20 is attached to the lower end curved portion 21 of the frame member 12 by suitable clamping members 22 and 23, a portion of which preferably are integrally formed on the bracket member 20. The clamping members preferably are attached with bolts to the frame member 12.

The bracket member 20 is a plate-like member which preferably is a cast metal. It may be formed with a plurality of laterally extending ribs 27, 28, 29 and 30 which, at the intersection thereof, provide a journal 31 having a bore 32 which accommodates a drive wheel axle 33. It will be observed that the journal extends perpendicular to the plate-like bracket member 20 and to either side thereof as clearly seen in FIG. 3.

The drive motor 24 may be secured to the bracket member by means of a pair of elongated bolts which extend through the motor and are secured in the projecting arms 34 and 35 of the bracket member 20. The motor 24 has a drive shaft 36 to which is secured a pinion gear 36A for driving the drive wheel 25, as hereinafter further explained. The drive wheel 25 may comprise an inflated tire 37 mounted on a tire rim 38. On one side of the tire rim there is formed an internal gear 39 which meshes with the pinion gear 36A driven by motor 24 whereby the drive wheel 25 is driven by the motor 24. The drive wheel 25 has a hub member 40 through which the drive wheel axle 33 extends. The drive wheel 25 may be secured on the drive axle 33 against longitudinal movement thereon by means of a snap ring 41 with the other end of the hub member 40 abutting the end of the journal 31.

The battery support means 26 is positioned on the drive wheel axle 33 extended as seen in FIG. 3. It includes a mounting lug 42 which is secured to the axle 33 by suitable means such as a set screw 43, for example. The lug 42 is formed with a bore 44 for receiving therein one leg portion 45A of a support arm 45. A battery supporting plate 46 is attached by suitable means such as by welding to leg 45B of arm 45 for supporting a battery 47. It will be observed that the lug 42 is also formed with a recess 48 into which the leg 45B of the support arm 45 may drop to thereby firmly position the battery during operation of the cart. It will be observed that the axle 33 also has a diametral bore 49 therethrough which is in register with bore 44 so that the leg portion 45A extends therethrough.

Suitable electrical wiring connections are provided between the battery, the motor, and a switch 50 mounted on the handle 15 whereby the motor is cut on or off. In conjunction with the switch 50, there is also preferably provided a rheostat arrangement for controlling the speed of the motor and thereby the drive wheel as desired. The wiring connections may be arranged so that the connection may be made by plugging into a socket 51 associated with the battery.

While operation of the electric caddy golf cart probably is reasonably clear from the description above, a brief summary of its operation will now be provided. It is contemplated that during storage of the unit in a car trunk as shown in FIG. 6, the battery and its support plate will be removed from the golf cart. When the golf cart is to be used, after removal from the car, the support plate 46 is attached to the drive wheel axle by inserting the portion 45A of the support arm 45 in the bore 44 of the lug 42 and inserting it far enough so that the portion 45B rests securely in the recess 48 in the lug 42. The battery 47 then may be strapped to the support plate 46 in a suitable manner. Prior to the positioning of the battery support plate on the drive wheel axle, the handle 15 has been manipulated to spread the wheels 13 from their folded position to a use position. After making the electrical connections, the switch may be turned to the "ON" position and the rheostat then operated to control the speed of the motor and the consequent speed of the drive wheel.

It will be apparent that I have advantageously provided a golf caddy cart with an electric drive attachment which makes possible the use of such a golf cart without the exertion of any appreciable amount of energy. Such a unit is particularly advantageous for those people having some kind of a physical impairment which would otherwise deprive them of using a hand driven golf cart of this type. It allows such people to partake of walking exercise without expending energy pulling or pushing the golf cart. The unit also has the obvious advantage that it is compact and can easily be stored in an automobile trunk. The easily removable battery may conveniently be left in the automobile trunk and provided with a recharging whenever needed.

While a preferred embodiment of the invention has been disclosed, it will be appreciated that this has been shown by way of example only, and the invention is not to be limited thereto as other variations will be apparent to those skilled in the art and the invention is to be given its fullest possible interpretation within the terms of the following claims.

What is claimed is:

1. A hand movable motorized golf cart comprising:
   an elongated frame member;
   handle means supported on said frame member for manipulating said golf cart;
   a pair of foldable wheels carried by said frame member;
   a bracket member supported on said frame member at the lower end thereof;
   journal means formed in said bracket member for supporting a drive wheel axle therein;
   a drive wheel axle supported in said journal means;
   a drive wheel rotatably supported on said axle;
   a drive motor mounted on said bracket member;
   drive means operatively connecting said motor and said drive wheel;
   said drive motor being adapted to be actuated by a battery power source, and
   battery support means mounted at one end of said drive wheel axle, said battery support means comprising a support lug secured to said drive wheel axle, a battery support plate, and a support arm to which said support plate is attached, said support arm being removably securable to said lug.

2. The motorized golf cart of claim 1 wherein
   a drive shaft extends from said motor and said drive means includes interconnecting gear means on said motor drive shaft and said drive wheel.

3. The motorized golf cart of claim 1 wherein
   a drive shaft extends from said motor and said drive means includes a pinion gear mounted on said drive shaft and an internal ring gear connected to said drive wheel.

4. The motorized golf cart of claim 1 including
   means on said lug for securing said support bar in a predetermined position.

5. The motorized golf cart of claim 1 including
   a rheostat control means mounted on said handle means and connected to said drive motor for controlling the speed of said motor and the drive wheel operated thereby.

6. A golf cart motor drive attachment comprising:
   a bracket member for attachment to the lower end of a golf cart elongated tubular frame member;
   journal means formed in said bracket member for supporting a drive wheel axle therein;
   a drive wheel axle supported in said journal means;
   a golf cart drive wheel rotatably supported on said axle;
   a drive motor mounted on said bracket member, said motor having a drive shaft extending therefrom;
   internal gear means connected to the side of said drive wheel and rotatable therewith;
   a pinion gear supported on said drive shaft and disposed in mesh with said internal gear for driving said drive wheel, and
   battery support means mounted on said drive wheel axle.

7. The drive attachment of claim 6 including
   detachable battery support means mounted on said drive wheel axle, said battery support means including means for positioning same in a predetermined position.

* * * * *